(12) United States Patent
Brainard

(10) Patent No.: US 9,306,741 B1
(45) Date of Patent: Apr. 5, 2016

(54) UPDATING KEYS FOR USE IN AUTHENTICATION

(75) Inventor: John G. Brainard, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 1110 days.

(21) Appl. No.: 12/976,575

(22) Filed: Dec. 22, 2010

(51) Int. Cl.
*H04L 29/06* (2006.01)
*H04L 9/08* (2006.01)

(52) U.S. Cl.
CPC ........ *H04L 9/0861* (2013.01); *H04L 29/06714* (2013.01); *H04L 63/08* (2013.01)

(58) Field of Classification Search
CPC .. H04L 9/0861; H04L 29/06714; H04L 63/08
USPC ........ 713/168, 172, 173, 176; 726/5, 8, 9, 19, 726/20; 380/44, 45
See application file for complete search history.

(56) References Cited

U.S. PATENT DOCUMENTS

| | | | |
|---|---|---|---|
| 2004/0172535 A1* | 9/2004 | Jakobsson et al. | 713/168 |
| 2010/0211799 A1* | 8/2010 | Gladstone et al. | 713/189 |

* cited by examiner

*Primary Examiner* — Brandon Hoffman
*Assistant Examiner* — Thong Truong
(74) *Attorney, Agent, or Firm* — Krishnendu Gupta; Jason A. Reyes; Deepika Bhayana

(57) ABSTRACT

A method is used in updating keys for use in authentication. A cryptographic operation is performed based on a stored representation of a higher-level key. The cryptographic operation results in a derived key. The derived key is used for authentication. A key update operation is applied to replace the derived key after authentication.

20 Claims, 10 Drawing Sheets

UPDATING KEYS FOR USE IN AUTHENTICATION

BACKGROUND

1. Technical Field

This application relates to updating keys for use in authentication.

2. Description of Related Art

Computer networks, and in particular Wide Area Networks (WANs) such as the Internet, provide opportunities for the misuse and abuse of communications traveling over the network. For example, two users (also referred to as "entities", e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

Methods for authenticating an identity of a user are known that are based on something the user knows, something that user has, a biological characteristics of the user (sometimes referred to as something the user is) or some combination of those things. One such computer-based authentication method involves the communication of a secret that is unique to a particular entity or user. The user that is seeking authentication transmits the secret to a verifier who authenticates the identity of the user. Typically, a user communicates both identifying information (such as a user name) and a secret (such as a password) to the verifier. The verifier typically possesses records that associate a secret with each user. If the verifier receives a secret that matches an appropriate record, the authentication of the user is successful. If the verifier receives an incorrect secret, the authentication fails.

In some systems, an entity uses a physical or a digital device, referred to as a token, that incorporates a secret. The secret, stored in some manner in the device, may or may not be known to the entity using the device.

To prove knowledge of a secret contained within the device, some devices provide an authentication code that is based upon, but different from, the secret code contained within the device. The use of such an authentication code allows the device to show knowledge of a secret without revealing it. In some systems, the authentication code is based on time-dependent information. The use of this sort of device has security benefits in that the secret is more difficult to determine by eavesdropping in the communications channel between the entity and the verifier, since the secret itself is not revealed.

Time-based authentication systems also associate a user or an entity with a secret, referred to as a seed, typically a number, which is unique to that entity. Authentication systems mathematically combine the secret with a time-varying value and a personal identification code provided by the user to generate an authentication code. These systems generally perform some algorithmic processing of the secret to generate an authentication code that is ultimately used to authenticate the entity. Some time-based authentication systems use a dynamic variable to calculate a non-predictable authorization code that ultimately authenticates the entity. Here, "non-predictable" means that the authorization code is not predictable by a party that does not know the associated secret, the algorithm for calculating the code, or both. The dynamic variable may comprise any code, typically a number, which is defined and determined by the interval of time in which an authentication code is generated. The dynamic variable can change according to any interval of time, e.g., 2 minutes, 5 minutes, 1 hour and the like. Because in these systems the authentication code changes from time to time, intercepted authentication information has a limited value for a limited time because it cannot be used for authentication in the future.

The user may employ a device to algorithmically compute the correct authentication code for a particular time. The algorithm is typically provided to the user in the form of a hardware token loaded with a program for carrying out the predetermined algorithm, although it may be provided as software executing on a general-purpose computer. The device may also allow the user to input a second, personally selected secret, such as a personal identification number (PIN) in order to generate a correct authentication code. Only a correctly entered PIN produces a correct authentication code for a particular time. One such device is the SECURID authentication token, available from RSA, The Security Division of EMC, Bedford, Mass. These devices can display the generated authentication code to the user, who may then communicate the authentication code to the verifier.

Although the dynamic nature of the generated authentication codes in these systems avoids problems inherent with using fixed authentication codes, such a device is still vulnerable to side channel attacks. In cryptography, a side channel attack is an attack based on information gained from the physical implementation of an authenticating system, rather than brute force or theoretical weaknesses in a mathematical algorithm. For example, timing information can provide an extra source of information which can be exploited to break the system. Some side-channel attacks require technical knowledge of the internal operation of the authenticating system on which the cryptography is implemented, although others are effective as black-box attacks. Attacks that are based on timing information may measure the time it takes to perform algorithmic computations. A timing attack watches data movement into and out of a CPU, or a memory of the hardware performing the mathematical algorithm. Simply by observing variations in how long it takes to perform cryptographic operations, it may be possible to determine the entire secret key. Such attacks involve statistical analysis of timing measurements, and have been demonstrated across networks.

Side channel analysis techniques are of concern because the attacks can be mounted quickly and can sometimes be implemented using readily available hardware costing from only a few hundred dollars to thousands of dollars. The amount of time required for the side channel attack and analysis depends on the type of attack. Some attacks may take a few seconds only. Side channel analysis typically find some information about the internal state of a cipher, that can be learned both by guessing part of a secret key, and additionally by some statistical property of the cipher that makes the secret key slightly non-random. Timing measurements are fed into a statistical model that can provide the secret key with some degree of certainty. Additionally, the number of samples needed to gain enough information to allow the recovery of the secret key are getting smaller as attacks are getting more sophisticated.

Further, a third party attacker may enter multiple guesses for the personally selected secret values during an authentication time period. By associating each personally selected secret with the resulting authentication code generated by the device, an attacker may mathematically solve or otherwise determine the personally selected secret. A similar problem could occur if the user mistakenly provides one or more incorrect secret values and communicates one or more incorrect authentication codes on an insecure channel before communicating a correct authentication code generated from a correct secret value. An eavesdropping attacker can obtain sufficient information from these exchanges to mathematically solve for or otherwise determine the personally selected secret. Although this form of attack could be thwarted by always transmitting the authentication code on a secure channel (such as one using encryption), such channels are not available in all environments or at all times. Thus, despite the security advantages of dynamic authentication code methods, some security disadvantages remain.

SUMMARY OF THE INVENTION

A method is used in updating keys for use in authentication. A cryptographic operation is performed based on a stored representation of a higher-level key. The cryptographic operation results in a derived key. The derived key is used for authentication. A key update operation is applied to replace the derived key after authentication.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in updating keys for use in authentication, which technique may be used to provide, among other things, deriving a key from a stored representation of a higher-level key by performing a cryptographic operation on the higher-level key and applying a key update function to replace the key after the key has been used for authentication.

Replacing the key after the key has been used for authentication in an authentication system helps combat security concerns that can arise when the authentication system is under side channel attacks. Conventionally, for instance, an attacker gaining access to a set of sample keys used multiple times in a time interval may be able to gain enough information to derive a key value by employing known mathematical algorithms, and the attacker can then use the key value to gain access to the authentication system. The use of current technique, as described in detail further below, can help address such security concerns by replacing the key after the key has been used for authentication. In accordance with the current technique, a key used in authentication may provide more security when the key is derived by employing a hierarchical derivation scheme combined with a key update scheme. The hierarchical derivation scheme creates a hierarchy of derived keys using a key derivation function (KDF). The hierarchical derivation scheme enables the authentication system to verify keys efficiently. However, conventionally, the hierarchical derivation scheme may use each derived key in the hierarchy of derived keys more than once, thus, reducing the protection against side-channel attacks. By contrast, in accordance with the current technique, the key update scheme replaces each derived key in the hierarchy of derived keys after each derived key has been used for authentication by performing a key update function (KUF). The key update scheme helps improve protection against side-channel attacks because the derived key is used only one time in the authentication system. However, the key update scheme may make verification of keys in the authentication system much more difficult and less efficient. In accordance with the current technique, by employing both hierarchical derivation scheme and key update scheme together in an authentication system provide efficient verification and maximum protection against side-channel attacks, thus, improving resistance to side-channel attacks.

Figure 1:
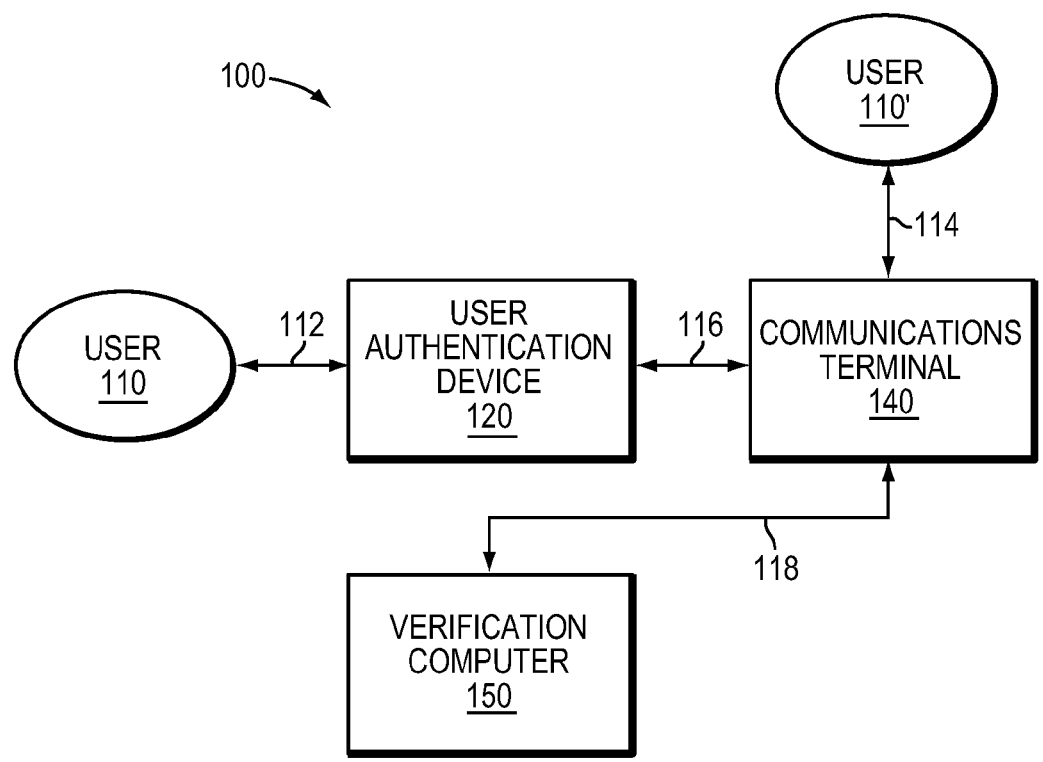
FIG. 1 is a block diagram illustrating an embodiment of an authentication system for securely authenticating the identify of the user.

Referring to FIG. 1, in one embodiment of an authentication system 100 according to the current technique, a verification computer 150 is used to help securely authenticate the identity of a user 110, 110'. As used herein, "authenticate" means to verify the identity of a user. Accordingly, "authenticate" and "verify" may be used interchangeably throughout. Also, although the specification will discuss, for simplicity, authorization of "users," it should be understood that "users" means any entity-requiring authentication such as, for example, a person, animal, device, machine, or computer. Authentication can result in the performance of one or more actions including, without limitation, providing access or privileges, taking action, or enabling some combination of the two. Access includes, without limitation: access to a physical location, communications network, computer system, and so on; access to such services as financial services and records, health services and records and so on; or access to certain levels of information or services. In one or more embodiments, the user 110 and the verification computer 150 can be in the same location as the user 110' or a location different from the user 110'. The user 110, 110' may be located proximal to or far away from the verification computer 150. As noted above, the user 110, 110' is typically a person, but can be any entity requiring authentication in a particular context, including without limitation a computer or other device or machine.

As shown in FIG. 1, a user 110 can communicate with a user authentication device 120. The user authentication device 120 may provide information used to authenticate the user 110. The user authentication device 120 can optionally provide a user interface 112. Communication between the user 110 and the user authentication device 120 can take place via this user interface 112. The user interface 112 may provide an input interface, an output interface, or both. An input interface enables the user 110 to communicate information to the user authentication device 120. The input interface can be any mechanism for receiving user input, and can include, without limitation: a keypad or keyboard; one or more push buttons, switches or knobs; a touch sensitive screen; a pointing or pressing device; a trackball; a device for capturing sound, voice or handwriting; a device for capturing biometric input such as a fingerprint, retina or voice characteristic; and so forth. An output interface may enable the user authentication device 120 to communicate information to the user 110 and can be any mechanism for communicating to a user, including, without limitation: a visual display to support alphanumeric characters or graphics such as a LCD display, LED display; one or more light sources; a sound or voice generator; a vibration interface; and so forth. In some embodiments, the user 110 may provide, via the user interface 112, identifying information (such as a user identifier, PIN, or password, or biometric characteristic), biological characteristics (such as a fingerprint, retina pattern, or voice sample), or possessions (such as physical keys, digital encryption keys, digital certificates, or authentication tokens) to the user authentication device 120.

The user authentication device 120 can have various forms in various embodiments of the current technique, provided that the user authentication device 120 performs the functions required of the user authentication device 120 for secure authentication. The user authentication device 120 can be implemented in packages having a wide variety of shapes and form factors. For example, the user authentication device 120 can be a credit-card sized and shaped device, or can be much smaller or much larger. One credit-card sized embodiment of the user authentication device 120 includes a microprocessor with on-board memory, a power source, and a small LCD display. The embodiment optionally includes a keypad or buttons for entry of PIN, request of authentication information, or for other entry or interaction with the device 120. In another embodiment, a credit-card sized device 120 includes a processor with on-board memory that is used as a "smart card." In still other embodiments, a credit-card sized device 120 is a card such as a credit card including a magnetic strip or other data store on one of its sides. In other embodiments, the user authentication device 120 is a "key fob," that is, a smaller device with a display and battery that is sized and shaped to fit on a key ring. In still other embodiments, the user authentication device 120 is a desktop computer, laptop computer, or personal digital assistant (PDA). For example, the authentication device 120 can be implemented as a software program running on a general-purpose computer, possibly interacting with one or more other computer programs on the same or a different computer. In still further embodiments the user authentication device can be a cellular telephone, or specialized hardware embedded in a cellular telephone and adapted to interact with the cellular telephone's circuitry. Other sizes, shapes, and implementations are possible without departing from the spirit of the invention.

Exemplary authentication devices with which the embodiments of the current technique can be used are members of the RSA SECURID family of authentication tokens, available from RSA, The Security Division of EMC, Bedford, Mass. Some RSA SECURID hardware devices, for example, display a generated OTP value to a user, who then communicates the displayed OTP value to a computer for communication to a verifier. For example, in one embodiment, the information may be a numerical value.

In some embodiments, the user authentication device 120 stores a seed or secret that may be used to authenticate the user 110. Typically, the stored secret may be information that only is available to the authentication device 120 and the verification computer 150. The user authentication device 120 may also provide other information, or perform other calculations or combination functions, as described further below. For example, in one embodiment, in addition to storing a secret the device 120 may receive a personally selected secret from the user 110 (such as a PIN or password) and generates a dynamic, non-predictable authentication code in response to the secret received from the user 110, the stored secret, and the current time. The user authentication device 120 optionally can also receive other input, such as an identification code associated with the verification computer 150, and can use that additional information in generation of the authentication code.

The exemplary user 110 optionally (and depending on implementation) has one or both of direct access to a communications terminal 140 and indirect access to the communications terminal 140 via the user authentication device 120. The communications terminal 140 can take various forms in various embodiments, including without limitation: a card reader; a device receptacle, cradle, or holder; a personal computer; a telephone; a personal digital assistant (PDA); a wireless transceiver; and so on. During the authentication process the user 110, 110' can directly communicate information to only the device 120, only the terminal 140, neither the device 120 nor the terminal 140, or both the device 120 and the terminal 140. Likewise, the communications terminal 140 can receive direct input from the user 110, 110' the user authentication device 120, or both. As shown, the user 110' optionally communicates directly with the communications terminal 140 via the communications terminal user interface 114 that can be present depending on the implementation of the communications terminal 140. Like the device user interface 112, the communications terminal user interface 114 can include an input interface, an output interface, or both. The input and the output interfaces can take one or more of the forms described above for the device user interface 112, or other forms.

The communications terminal 140 can optionally provide a device/terminal interface 116 for communications between the communications terminal 140 and the user authentication device 120. In one embodiment, this interface can take the form of a wired or wireless communications channel between the terminal 140 and the device 120, using standard or proprietary protocols. For example, in an embodiment in which the user authentication device 120 is a smart card and the communications terminal 140 includes a card reader, the communications interface 116 could be a wired serial communications link between the smart card and the reader. In another embodiment in which the user authentication device 120 is a token that has wireless communications capability and the terminal 140 includes a wireless transceiver, the interface 116 could be a wireless link. As another example, in an embodiment in which the card has a magnetic stripe (such as commonly found on a credit card), and the communications terminal 140 includes a magnetic stripe reader, the interface 116 could include the magnetic reader and the standard protocols used to communicate the information from the magnetic stripe on the card when the card is run through the reader.

The communications terminal 140 can provide a user interface 114 without providing a device interface 112 for the user authentication device 120. For example, the communications terminal 140 can be a telephone that the user 110' uses to communicate authentication information to the verification computer 150. In such an embodiment the user authentication information can be represented as tones associated with a series of alphanumeric digits. In this embodiment the user 110' dials a telephone number to establish a communications connection with the verification computer 150 and performs a series of key presses on the telephone to communicate the alphanumeric user authentication information to the verification computer 150.

The communications terminal 140 and the user authentication device 120 can each be integrated, together or separately, into another device, likewise, the functionality of the communications terminal 140, the user authentication device 120, and their respective interfaces 112, 114, 116 can be implemented in separable components. For example, the user authentication device 120 can be implemented as an add-in card to a handheld computer (not shown) or as a plug-in software component. A handheld computer may provide the user interface 112 and also provides the communications terminal 140 in the form of a wireless network interface. Likewise, a mobile telephone can provide communications terminal 140 and user interface 112 functions, while the mobile telephone, or a plug-in component such as a SIM card, provides some or all the user authentication device 120 function.

The communications terminal 140 may communicate information to the verification computer 150 via a communications channel 118. The communications channel 118 may be any method and/or interface that enables communication of information to the verification computer 150 that may be required to authenticate the identity of the user 110. The communications terminal 140 can communicate information generated by the user 110, 110', the device 120, or both, to the verification computer 150 over communications channel 118. The communications terminal 140 and the verification computer 150 can implement the communication channel 118 through a variety of connections including standard telephone lines, LAN or WAN links (e.g., T1, T3, 56kb, X.25), broadband connections (ISDN, Frame Relay, ATM), and wireless connections. Connections between the communications terminal 140 and verification computer 150 can be established using a variety of communication protocols (e.g., TCP/IP, IPX, SPX, NetBIOS, Ethernet, RS232, and direct asynchronous connections). The verification computer 150 may process the information received from the communications terminal 140. The verification computer 150 can perform actions in response to authenticating the identity of the user 110. For example, the verification computer 150 can grant on-line access to data or physical access to restricted areas or physical items.

Conventionally, an authentication code communicated over the communications channel 118 is designed to be different and unpredictable (to an observer without knowledge of the algorithm used to generate the authentication code) for each user authentication attempt. However, the authentication code remains vulnerable to side channel attacks. In accordance with the current technique, an authentication code may provide more security when the authentication code is generated in response to a secret key that is derived using the hierarchical derivation scheme and replaced using the key update scheme after authentication as described further in detail below.

In at least some implementations, in accordance with the technique as described herein, an authentication system uses the hierarchical derivation scheme to create a hierarchical tree of derived keys, and then uses the key update scheme to replace each derived key at each level of the hierarchical tree of derived keys. Thus, the current technique provides optimal or improved resistance to side channel attacks and at the same time maintains efficiency in deriving keys for generating authentication codes. In accordance with the current technique, a hybrid scheme where both the hierarchical derivation scheme and the key update scheme are employed together provides both efficient verification and maximum protection against side channel attacks.

Still referring to FIG. 1, for each user authentication attempt, the verification computer 150 may receive user authentication information and may verify the received information. In some embodiments, the verification computer 150 performs an algorithmic calculations for each user authentication attempt that is substantially identical to the algorithmic calculation performed by the user authentication device 120 in order to authenticate the user. The verification computer 150 compares both copies of authentication information (i.e., the authentication information received over communications channel 118 and the authentication information generated by the verification computer 150) to determine if they match. If a match occurs, then the verification computer 150 authenticates the identity of the user. If the received and generated user information do not match, the user authentication attempt fails.

Figure 2:
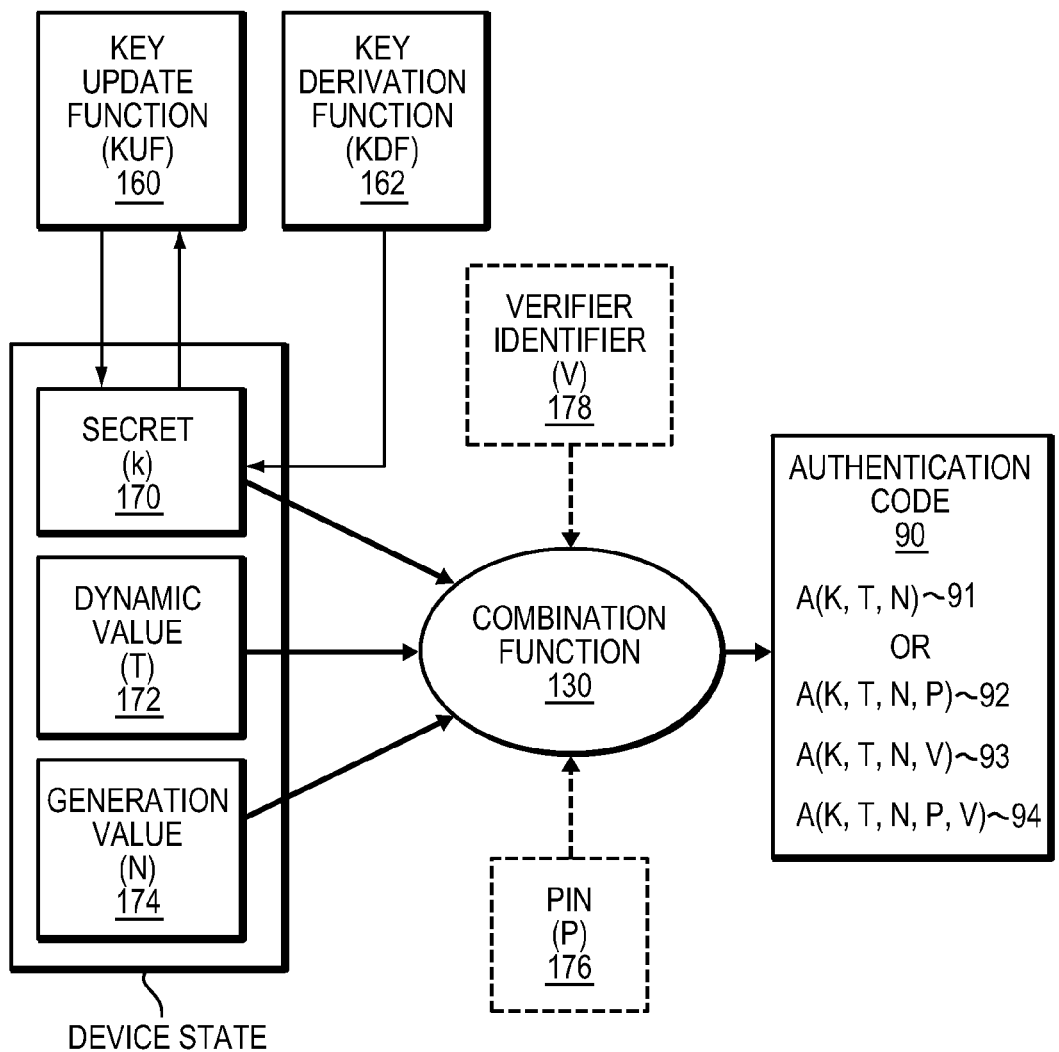
FIG. 2 is a diagram illustrating various values that are combined by an embodiment of a combination function to generate an authentication code.

Referring to FIG. 2, in one embodiment of the user authentication device 120 and verification computer 140 of FIG. 1, various values can be combined by a combination function 130 to generate an authentication code 90. The combination function 130 generates an authentication code 90 using the state of the user authentication device 120. FIG. 2 illustrates, examples of device state that may be used, secret (K) 170 stored by the user authentication device 120, which will be discussed in greater detail below, a dynamic, time-varying value (T) 172 generated by the user authentication device 120, and a generation value (N) 174. Other examples of device state include the time and date of manufacture of the user authentication device 120, the amount of time since generation of the last authentication code, an encoding of the latitude and longitude of the location of manufacture of the user authentication device 120, an encoding of the location of the user authentication device 120 at the time of generation of the user authentication device (using GPS or enhanced GPS, for example), or other similar quantities. The device state used by the combination function 130 may include one or more of the quantities described above. The combination function 130 can also optionally use user state (shown in phantom view in FIG. 2 as PIN (P) 176) or verifier states (shown in phantom view in FIG. 2 as verifier identifier (V) 178) to generate an authentication code (A) 90 for a user. Other examples of user state include biometric information such as retinal scans and fingerprints, and identifying information such as social security number, birth date (possibly including time of birth) or employee codes. Verifier state 178 may include information identifying the verification computer 150, such as IP address or processor serial number of the verification computer.

The combination function 130 can be implemented as instructions executed by a computer, for example, by firmware running on an embedded microprocessor. In other embodiments, the combination function 130 can be implemented in special-purpose hardware, such as an application specific integrated circuit, a field-programmable gate array, or other programmable logic device. In still other embodiments, the combination function 130 may be implemented as a software application program running on a general-purpose desktop, laptop, or handheld computing device.

FIG. 2 depicts generally a number of exemplary embodiments for generating the authentication code 90. It should be understood that the manner of combination and the input provided to the combination function 130 could vary from these examples. In one embodiment, an authentication code 91 may be constructed from a stored secret (K), a dynamic value (T), and a generation value (N). In this embodiment, the authentication code (A) 91 may be represented as a function of elements K, T, and N, which may be written as A (K, T, N). Also, the combination function 130, and the elements of the combination function 130 can be implemented in the user authentication device 120, the communications terminal 140, or some combination of the two.

The dynamic value (T) 172 may be a unit of information such as a numerical value (e.g. hexadecimal, decimal, or binary) that changes over time. In one embodiment, the dynamic value (T) 172 can be uniquely associated with a particular pre-determined time interval demarcated by a particular starting time and ending time. The time interval may not be required to be of any particular length nor is every time interval required to be the same length. The only requirement may be that the time interval schedule be roughly synchronized between the device 120 and the verification computer 150. Exemplary methods that can be used to synchronize the device 120 and the verification computer 150 are described in U.S. Pat. No. 4,885,778, entitled "Method and Apparatus for Synchronizing Generation of Separate, Free Running, Time Dependent Equipment." A time interval could have the length of a minute, an hour, a month, a year, or any other convenient length of time. In one embodiment, the dynamic value (T) 172, identifying a particular time interval, could remain constant for all authentication codes generated within that particular time interval.

For example, in one embodiment, a constant time interval of a minute may be used, and the dynamic value may be the number of minutes since Midnight, Jan. 1, 1980. In another embodiment, a time interval of an hour may be used and the dynamic value could be the number of seconds since Noon, Dec. 15, 1999. The number of seconds can be determined for the first second of each time interval. In such an embodiment, the time from which counting begins can be a secret that is shared between the device 120 and the verification computer 150. The interval period length(s) can also be secrets that are shared between the device 120 and the verification computer 150.

In another embodiment, the length of each time interval may be an hour. Since, there are 24 hours in a day, each hour can be identified by a unique value such as the values 1 through 24; each of the 365 days of the year can be uniquely identified by the values 1 through 365; and each year can be identified by the number of the year, for example 2001. These three values, each identifying an hour, a day or a year, can be combined in such a manner to produce a value that uniquely identifies one and only one particular one-hour time interval. This one hour time interval can be indicated by a particular (hour-day-year) combination. For example, the value 100232001 would uniquely identify the period of time between 9:00 am and 10:00 am on the $23^{rd}$ day (023) of the year 2001 (2001), that is Jan. 23, 2001. Similarly, the value 170322001 would uniquely identify the time period between 4:00 pm and 5:00 pm on the $32^{nd}$ day (032) of the year 2001 (2001), that is Feb. 1, 2001. Other variations will be immediately understood by those of ordinary skill in the art.

In one embodiment, the dynamic value (T) 172 could be provided as the output of a time clock function, which may in turn be provided to a dynamic value function. The time clock function provides the current time to the dynamic value function. The dynamic value function could determine the appropriate dynamic value (T) 172 in response to the data provided by the clock function. In one such embodiment, implemented in a device having a clock and a processor, the dynamic value (T) 172 can be generated by a clock that may be a counter set to an initial value and incremented every second. This clock may count the number of seconds since the initially configured time. Every sixty seconds the clock may signal the dynamic value function, which reads the clock, increments the dynamic value (T) 172, and stores the incremented dynamic value as the dynamic value (T) 172 for that time interval.

In some embodiments, generation value (N) 174 may be a unit of information, such as a numerical value, that is uniquely associated with each authentication code generated during a particular time interval. For example, in one embodiment, the generation value may be changed such that no two authentication codes generated within the same time interval by the combination algorithm 130 are associated with the same generation value (N) 174. The generation value may be generated by a counter that is reset at the beginning of each time interval and may be incremented upon each generation of an authentication code. Also, the counter value itself may be used as the generation value. Alternatively, in another embodiment, the counter output can be provided as an input to a cryptographic or arithmetic function that determines the generation value.

In one embodiment, the secret (K) 170, the dynamic value (T) 172 and the generation value (N) 174 can be provided to the combination function 130 for combination as authentication code A (K, T, N) 91. The combination of the secret (K) 170, the dynamic value (T) 172 and the generation value (N) 174 can take place in any order and can use one or more various combination methods.

Still referring to FIG. 2, user data, such as a personal identification number (PIN) value (P) 176 can also be provided as input to the combination function 130. The user data, such as PIN, can be a unit of information such as an alphanumeric character string, or a strictly numerical value, uniquely associated with the user 110, 110'. In one embodiment, the identity or value of the user data (PIN) can be a secret known only to the user 110, 110' and the verification computer 150 (i.e., not to the device). The user data (PIN value (P) 176) can be stored in a manner accessible to the verification computer 150 that protects it from being compromised. The user data (PIN value (P) 176) could be, for example, the actual PIN, or biometric data that may be provided by the user, or the user data value (P) 176 can be the result of processing of the user data by one or more other functions. For example, in one embodiment, the user data (PIN (P)) 176 can be mapped to another value with a one-way function, such as a hash function, or a key derivation function before being provided as an input to the combination function 130.

In one embodiment, the combination function 130 may combine the user data value (PIN value (P) 176) with the secret (K) 170, the dynamic value (T) 172, and the generation value (N) 174 to generate an authentication code A (K, T, N, P) 92. The combination function 130 can combine these values (K, T, N, P) in any order to generate the authentication code 92. Certain combinations can take place on the user authentication device 120 while others can take place on the communications terminal 140. Of course, it should be understood that the combination can include as variations other values or processing. As described, various embodiments of the device 120 can receive input of the user data (PIN) 176 in various ways. These can include without limitation, user input of the PIN (P) 176 via a keypad, a keyboard, a touch sensitive screen, selection with a pointer or mouse, handwriting recognition, voice recognition and so on. The PIN can also be communicated from another device via electrical or electromagnetic means.

Referring once again to FIG. 2, in another embodiment, a verifier identifier (V) 178 can also be provided as input to the combination function 130. The verifier identifier (V) 178 is a value associated with the identity of a particular verification computer (150) or group of verification computers. The use of the verifier identifier (V) 178 allows the same user authentication device (with the same secret (K)) to be used with verifiers operated by different entities without giving a particular entity information that could be used to impersonate the user to another entity. Techniques for implementing such systems are described in U.S. Pat. No. 6,985,583, titled "System and method for authentication seed distribution," by Brainard et. al. the contents of which are hereby incorporated herein by reference.

For example, in one embodiment, the combination function 130 can combine a verifier identifier (V) 178, a secret (K) 170, a dynamic value (T) 172 and a generation value (N) 174 to generate an authentication code 93. The combination function can combine these values (K, T, N, V) in various ways and in any order. For example, the combination function can optionally first combine (K, T, N) to generate an authentication code 91 and then combine the authentication code 91 with a verifier identifier (V) to generate an authentication code 93 as a function of (K, T, N, V). Further, for example, in one embodiment, the combination function 130 can combine a PIN (P) 176, a verifier identifier (V) 178, a secret (K) 170, a dynamic value (T) 172 and a generation value (N) 174 to generate an authentication code 94.

In one embodiment, the stored secret (K) 170 can be a unit of information such as a numerical value that is uniquely associated with the user authentication device 120. The secret (K) 170 may be a value that is chosen from a large number of possible values such that it would be difficult for an opponent who had access to the output of the combination function 130 to guess the secret (K) 170 by trying each possible secret value to see if it resulted in the observed authentication code.

Within a conventional authentication system, a secret (K) may be derived from a master secret ($K_{MASTER}$), as described in U.S. Pat. No. 6,985,583, entitled "System and method for authentication seed distribution," by Brainard et. al. the contents of which are hereby incorporated herein by reference. Conventionally, the secret (K) used to generate an authentication code evolves with a passage of time. In such a conventional system, the secret (K) may evolve each hour, each day, each month, or each year. In such a conventional system, this may be accomplished by generating representing secret (K) as a set of secrets: one corresponding to the current year ($K_Y$), one corresponding to the current month ($K_M$), one corresponding to the current day ($K_D$), one corresponding to the current hour ($K_H$), and one corresponding to the current minute ($K_{MIN}$), that is, $$K=(K_Y,K_M,K_D,K_H,K_{MIN})$$

For example, in such a conventional system, the yearly secret ($K_Y$) may be generated by using a block cipher with a seed secret as the key and the current year, appropriately padded, as the data value. For example, if using a 128 bit block cipher, the current year value (0000-9999) may be padded with 0's, 1's, or some random pattern that is known to a verification computer, in order to provide a 128 bit data block. Thus, $$K_Y=E_K(YYYYPPPPPPPPPP)$$

where P represents padding and $E_K$ represents a block cipher of the data YYYY using the seed secret as the key. In a similar manner, in such a conventional system, a monthly secret may be derived by applying a block cipher a second time:

$$K_M=E_{KY}(YYYYMMPPPPPPPPPP)$$

where YYYYMM represents the current month and year values and the yearly secret is used as the key to the block cipher. In such a conventional system, daily and hourly seeds can similarly be generated:

$$K_D=E_{KM}(YYYYMMDDPPPPPP) \text{ and}$$

$$K_H=E_{KD}(YYYYMMDDHHPPPP)$$

Conventionally, each of the secrets may be used during a time interval responsive to a generation value (N). For example, in such a conventional system, an initial authentication code may be provided during the first authentication code generation during a time interval. Further, conventionally in such a case, if a second authentication code is required during that same time interval, the user authentication device may choose one of the yearly secret, the monthly secret, the daily secret, or the hourly secret to provide as input to the combination function to generate the authentication code. Alternatively, in such a conventional system, a new minute secret may be generated to create a new secret (K) that may be used as input to the combination function. Further, in such a conventional system, new secrets may also be generated at the expiration of specific time periods. Although the above example has been given with respect to block ciphers, any of the methods described here for generating the secrets may be used (e.g. hash functions). Other techniques for generating new seed values are described in U.S. Pat. No. 5,361,062, titled "Personal security system," the contents of which are incorporated herein by reference. Further, methods that may be used in such a conventional system for performing time-based authentication are described in U.S. Pat. No. 7,363,494, titled "Method and apparatus for performing enhanced time-based authentication," the contents of which are incorporated herein by reference.

Conventionally, using the same secret key more than once in a specific time interval increases the risk of side channel attacks and also increases the possibility that an attacker might guess the secret key in that time interval by employing statistical means. For example, in such a conventional system, as explained above, the key $K_Y$ is used throughout the whole year in which the key $K_Y$ is derived, the key $K_M$ is used throughout the whole month in which the key $K_M$ is derived and the key $K_H$ is used throughout the whole hour at which the key $K_H$ is derived. Thus, in such a conventional system, the attacker might collect enough sample of random keys in the hour in which the key $K_H$ is used repeatedly and use the sample of random keys to guess the key $K_H$ used by the authentication device.

By contrast, in at least some implementations in accordance with the technique as described herein, the use of updating keys for authentication can provide one or more of the following advantages: improving protection against side channel attacks by using an updated key at each authentication request and improving efficiency by efficiently generating a key for verification. Still referring to FIG. 2, in at least some implementations in accordance with the technique as described herein, secret (K) 170 is generated from a hierarchy of derived keys by using a key derivation function (KDF) 162 at every level of the hierarchy of derived keys. Further, the secret (K) 170 is replaced by using a key update function (KUF) 160 after the secret (K) 170 has been provided to combination function 130 to generate an authentication code 90. By replacing the secret (K) 170 each time the secret (K) 170 is used for generating an authentication code eliminates privacy concerns where the attacker can not possible collect sample of random keys to guess the secret key because the key is changed with every authentication request.

Figure 3:
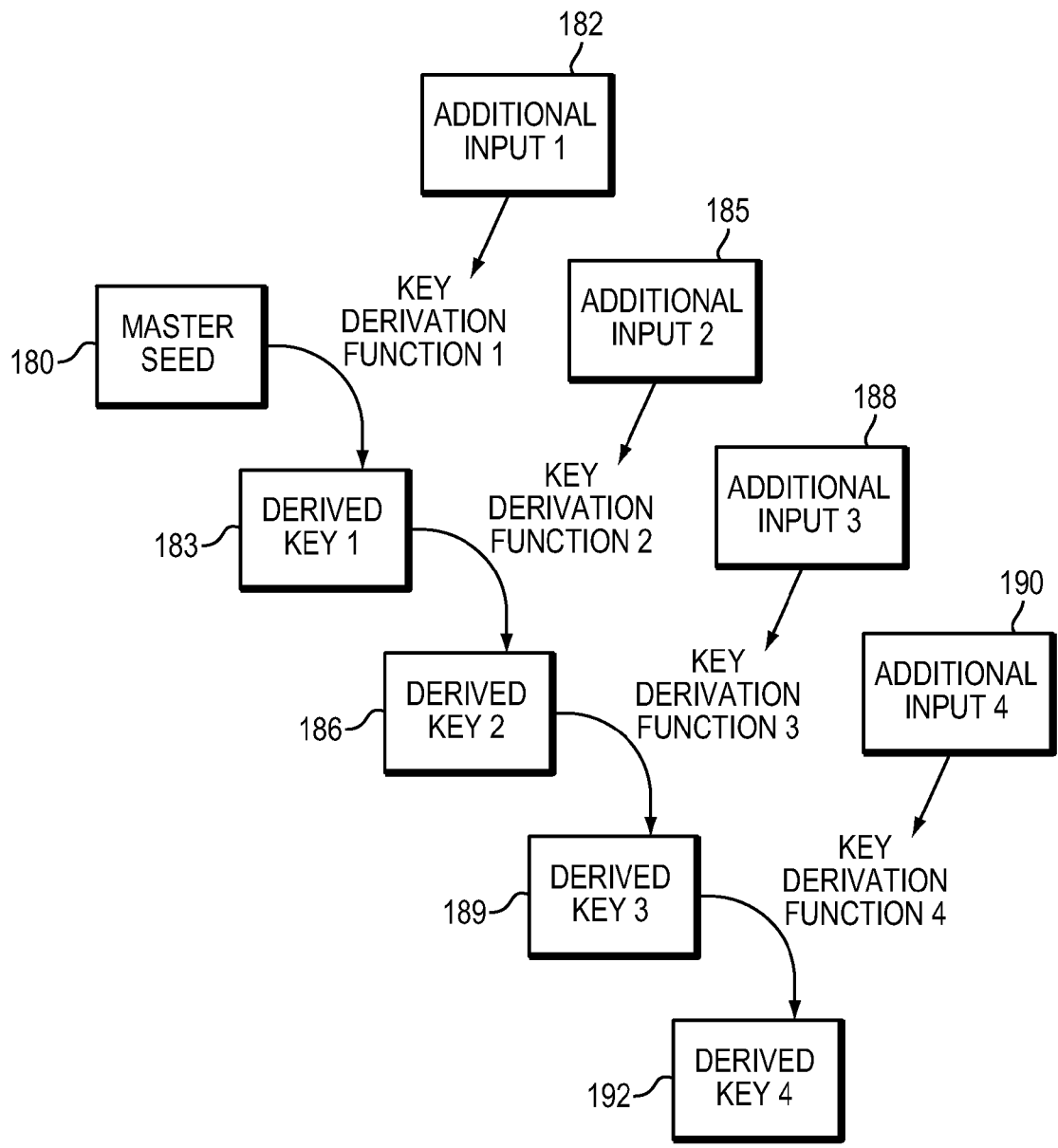
FIG. 3 is a view of a chain of derived keys stemming from a master seed.

FIG. 3 illustrates a hierarchical derivation scheme that may be included in an embodiment using the techniques herein. According to the hierarchical derivation scheme, a set of keys are generated where keys are derived from precursor keys; and where each key may be involved in the derivation of one or more subordinate keys over time, as shown in FIG. 3. Examples of relationship between the keys in such a structure are often shown as chain of keys, a tree of keys, a branch of a tree of key, or some other representation. That is, the user authentication device 120 performs a first key derivation function to derive a first derived key from a master key (also referred to as "master seed"). Next, the authentication device 120 performs a second key derivation function to derive a second derived key from the first derived key and so on. Each key derivation function (KDF) may include, as additional input, extra information (e.g., a nonce value, a predefined value, a group password, etc.) as an additional security measure. The authentication device 120 then uses the lowest-level derived key at the time of authentication to generate an authentication code. For example, in FIG. 3, master seed 180 is mathematically combined with additional input-1 182 to produce derived key-1 183 by using key derivation function-1. A key derivation function (KDF) has the characteristic that a third party cannot feasibly determine the master seed by knowing a derived key and an additional input. The derived key-1 183 is then mathematically combined with additional input-2 185 to produce derived key-2 186 by using key derivation function-2. Next, derived key-2 186 is mathematically combined with additional input-3 188 to produce derived key-3 189 by using key derivation function-3. Next, derived key-3 189 is mathematically combined with additional input-4 190 to produce derived key-4 192 by using key derivation function-4. The derived key-4 192 represents the lowest-level derived key in the hierarchy of derived keys. The derived key-4 192 is then combined with additional inputs, such as dynamic value (T) 172, generation value (N) 174 and so on, as described above in FIG. 2, to generate an authentication code. used for authentication by the user authentication device 120. This is typically done by cryptographically combining the lowest-level derived key with some dynamic variable (e.g. time, a counter variable, a challenge, etc) to produce an authentication code, which is a function of at least the dynamic variable and the derivative key. This authentication code is then sent to the verification computer 150. The verification computer 150 validates the authentication code to confirm identify of a user.

Figure 4:
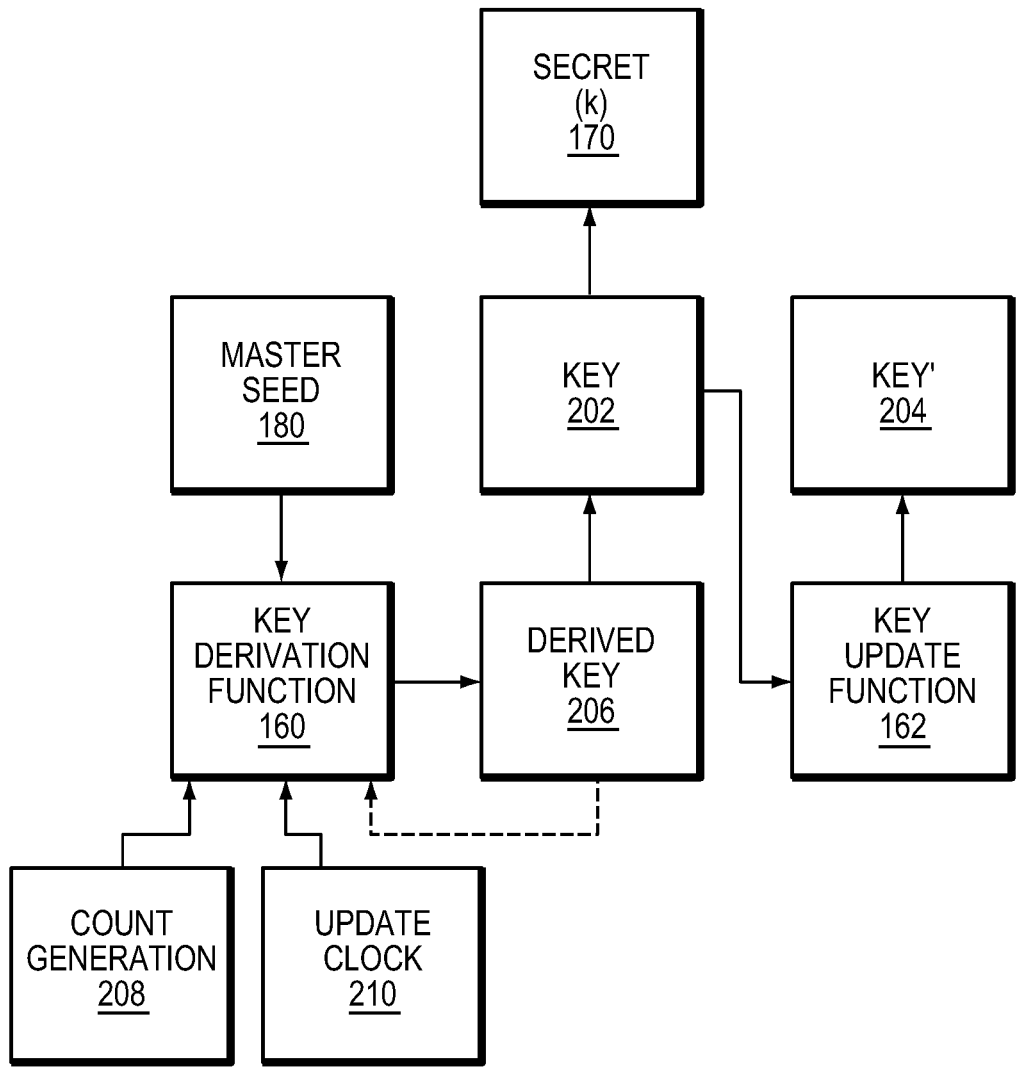
FIG. 4 is a block diagram illustrating in more detail components that may be used in connection with techniques herein.

Referring to FIG. 4, shown is a more detailed representation of components that may be included in an embodiment using the techniques herein. With reference also to FIG. 2 and FIG. 3, as described above, in accordance with the current technique, the authentication system 100 generates derived key 206 from master seed 180 by using key derivation function ("KDF") 160. Key derivation functions are well known in the field of encryption. Key derivation functions are generally chosen for a capability to generate relatively distinct outputs for different inputs, and because they are hard to reverse, meaning that it is difficult, given a particular output, to determine the input. Key derivation functions may be based on hash functions, pseudorandom functions, and/or any other encryption algorithms. Key derivation functions combine the secret key with other information. The secret key may also be a password. In at least one embodiment of the current technique, the secret key (K) 170 is based on derived key 206. In some other embodiment of the current technique, an iterative function may also be included in a key derivation function. A number, referred to as an iteration count, can be used to indicate how many times an underlying function is performed to derive the secret key (K) 170. It should be understood that other key derivation functions would be similarly useful, and various substitutions for the user information and other information are possible, as required by the particular key derivation function. Key derivation functions based on underlying hash functions, block ciphers, message authentication codes, and so on are among other alternatives that can be employed to generate secret key (K) 170.

Also notice that the master seed 180 itself is never used for authentication. Also note that a user of the authentication system 100 must have the ability to store the master seed and must have key derivation capability, and must know the key derivation function 160. This capability can be contained with the token employed by the user in connection with the user authentication device 120, communications terminal 140 or it can be contained within a combination of those devices.

In at least one embodiment of the current technique, which employs the key derivation function, the inputs to the key derivation function are thus the master seed 180 and a derived key from previous level within a hierarchy of derived keys. The hierarchy of derived keys are generated by using key derivation function (KDF) 160 iteratively in such a way that a derived key generated at previous iteration serves as an input to key derivation function 160 during the next iteration. A key representing the lowest-level key in the hierarchy of derived keys is used as a secret (K) 170 to generate an authentication code. The KDF should be a strong cryptographic function so that compromise of a lower-level key does not expose the key it was derived from. After each use of a key, the key is updated using a key update function (KUF) 162. The KUF 162 changes value of the key value sufficiently to thwart side-channel attacks, but may not need the cryptographic strength or complexity of the key derivation function (KDF). For example, in FIG. 4, key 202 is updated to key' 204 by using a key update function (KUF) 162 and used as a secret key (K) for generating authentication code after the key 202 has been used for authentication. Inputs to key derivation function 160 may also include a count generation scheme 208 and an update clock 210.

In some embodiments, the update clock 210 can be provided by an external clock, for example, the clock of the communications terminal 140. In some other embodiments, the update clock 210 may also be implemented in a device having a clock and a processor, the clock may be a counter set to an initial value and incremented every second. This clock may count the number of seconds since the initially configured time. Every sixty seconds the clock may signal the key derivation function 160, which then reads the clock and include information from the clock as an input for producing the hierarchy of derived keys. In some embodiment, the count generation scheme 208 may be based on an iterative function that increments a counter and provides value of the counter to the key derivation function 160 as an input for producing the hierarchy of derived keys.

Figure 5:
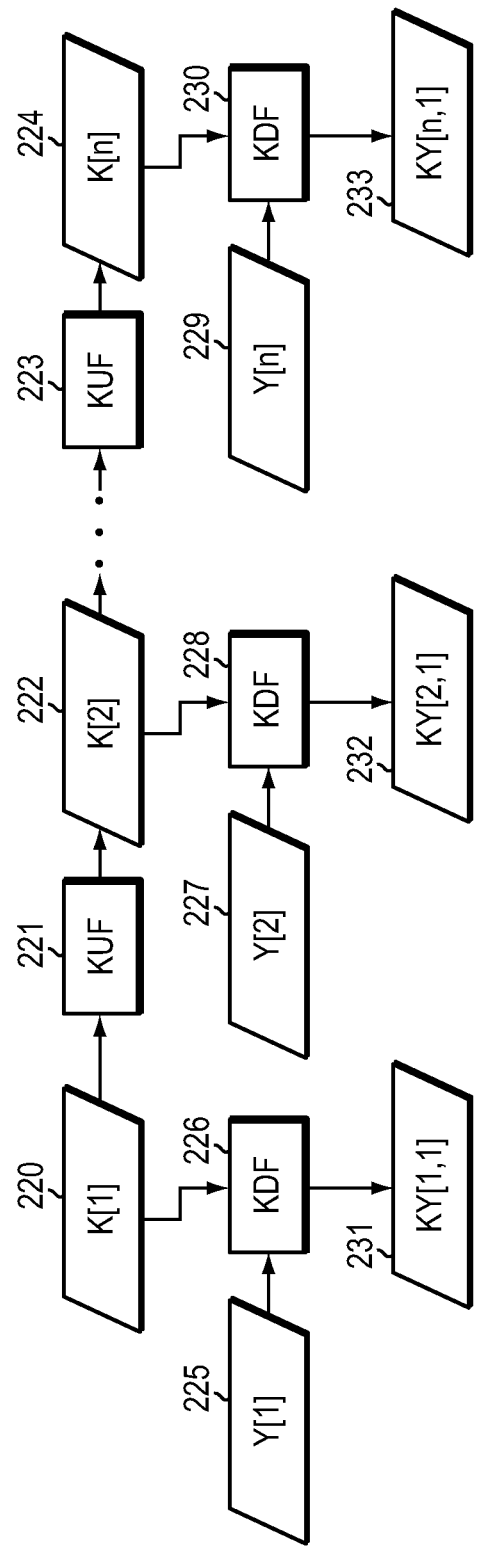
FIGS. 5-9 are illustrations of an example seed derivation procedure carried out by the authentication system of FIG. 1 that may be used in connection with techniques herein.

Referring to FIG. 5, shown is a diagram illustrating a second-level hierarchy of yearly keys in a hierarchy of derived keys that may be included in an embodiment using the techniques herein. Every year a new yearly key is generated by using a key update function (KUF) on a key representing the yearly key for previous year. Further, a second-level derived key is generated from the yearly key by using a key derivation function (KDF). For example, in one embodiment, K[1] 220 is a top-level key during a first year. K[2] 222 is a top-level key during a second year, and K[n] 224 is a top-level key during nth year. A second-level key is derived from the top-level key where the second-level key is then further used to derive a next-level key as explained below in FIG. 6. K[1] 220 is used to generate a second-level derived key representing a key to be used during first month of the first year. The second-level derived key KY[1, 1] 231 is derived from K[1] 220 by using key derivation function ("KDF") 226. The KDF takes as input Y[1] 225. The input Y[1] 225 represents value of date and time at the start of the first year. At the end of the first year, K[1] 220 is updated by using key update function 221 to generate key K[2] 222 representing a top-level key for the second year. K[2] 222 is used to generate a second-level derived key representing a key to be used during first month of the second year. The second-level derived key KY[2, 1] 232 is derived from K[2] 222 by using key derivation function ("KDF") 228. The KDF take as input Y[2] 227. The input Y[2] 227 represents value of date and time at the start of the second year. Similarly, K[2] 222 is then updated by using a key update function to derive a top-level key for the next year. Thus, K[n] 224 represents top-level key for nth year that is generated by applying key update function 223. The top-level key is then used to generate a second-level derived key KY[n, 1] 233. The second-level derived key represents key to be used during first month of nth year. The second-level derived key is generated by using KDF 230 that takes as an additional input Y[n] 229 where the input Y[n] 229 indicates value of date and time at the start of nth year.

Figure 6:
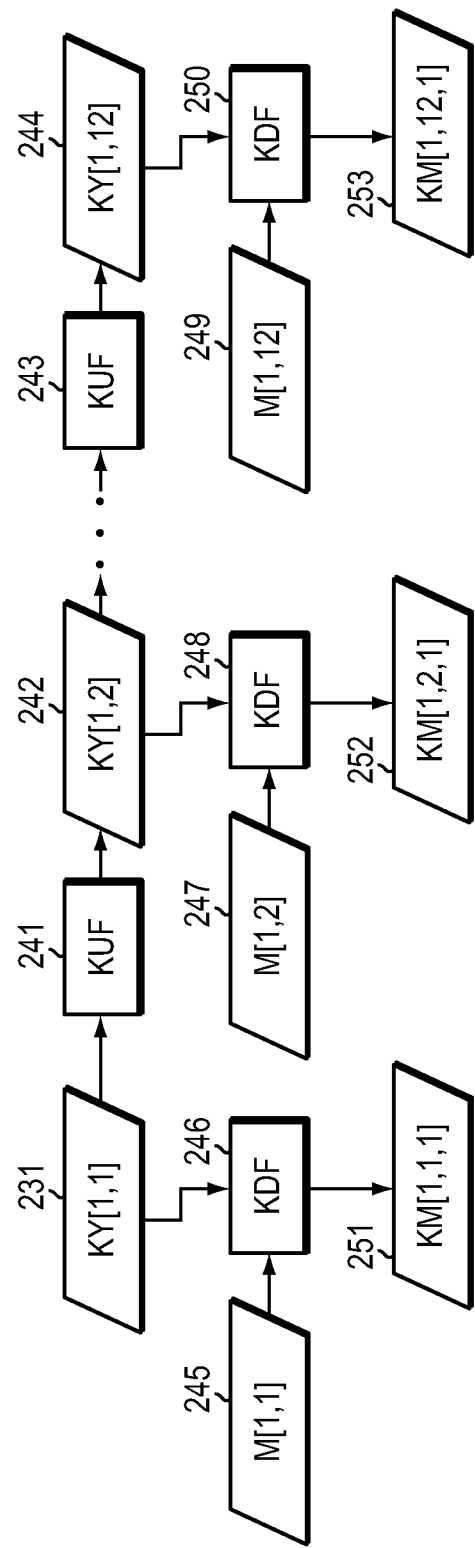

Referring to FIG. 6, shown is a diagram illustrating a third-level hierarchy of monthly keys in a hierarchy of derived keys that may be included in an embodiment using the techniques herein. Every month a new monthly key is generated by using a key update function (KUF) on a key representing the monthly key for previous month. Further, a third-level derived key is generated from the monthly key by using a key derivation function (KDF). For example, in one embodiment, KY[1, 1] 231 is a second-level key during first month of the first year. KY[1, 2] 242 is a second-level key during second month of the first year, and KY[1, 12] 244 is a second-level key during last month of the first year. A third-level key is derived from the second-level key where the third-level key is then used to derive a next-level key as explained below in FIG. 7. KY[1, 1] 231 is used to generate a third-level derived key representing a key to be used during first day of first month of the first year. The third-level derived key KM[1, 1, 1] 251 is derived from KY[1, 1] 231 by using key derivation function ("KDF") 246. The KDF takes as input M[1,1] 245. The input M[1,1] 245 represents value of date and time at the start of first month of the first year. At the end of the first month, KY[1, 1] 231 is updated by using key update function 241 to generate key KY[1, 2] 242 representing a second-level key for the second month of the first year. KY[1, 2] 242 is used to generate a third-level derived key representing a key to be used during first day of second month of the first year. The third-level derived key KM[1, 2, 1] 252 is derived from KY[1, 2] 242 by using key derivation function ("KDF") 248. The KDF take as input M[1, 2] 247. The input M[1, 2] 247 represents value of date and time at the start of the second month of the first year. Similarly, KY[1, 2] 242 is then updated by using a key update function to derive a second-level key for the next month. Thus, KY[1, 12] 244 represents second-level key for last month of the first year that is generated by applying key update function 243. The second-level key is then used to generate a third-level derived key KM[1, 12, 1] 253. The third-level derived key represents key to be used during first day of the last month of the first year. The third-level derived key is generated by using KDF 250 that takes as an additional input M[1, 12] 249 where the input M[1, 12] 249 indicates value of date and time at the start of last month of the first year.

Figure 7:
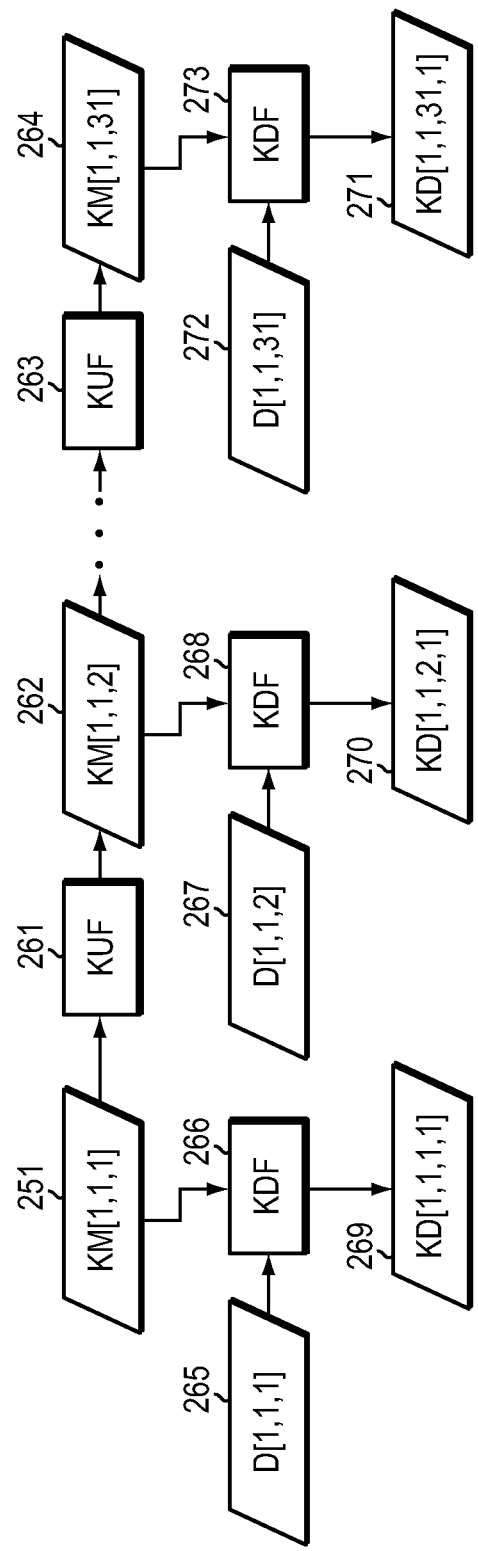

Referring to FIG. 7, shown is a diagram illustrating a fourth-level hierarchy of daily keys in a hierarchy of derived keys that may be included in an embodiment using the techniques herein. Every day a new daily key is generated by using a key update function (KUF) on a key representing the daily key for previous day. Further, a fourth-level derived key is generated from the daily key by using a key derivation function (KDF). For example, in one embodiment, KM[1, 1, 1] 251 is a third-level key during first day of the first month of the first year. KM[1, 1, 2] 262 is a third-level key during second day of the first month of the first year, and KM[1, 1, 31] 264 is a third-level key during last day (e.g., 31$^{st}$ day) of the first month of the first year. A fourth-level key is derived from the third-level key where the fourth-level key is then used to derive a next-level key as explained below in FIG. 8. KM[1, 1, 1] 251 is used to generate a fourth-level derived key representing a key to be used during first hour of first day of first month of the first year. The fourth-level derived key KD[1, 1, 1, 1] 269 is derived from KM[1, 1, 1] 251 by using key derivation function ("KDF") 266. The KDF takes as input D[1, 1,1] 265. The input D[1, 1, 1] 265 represents value of date and time at the start of first day of the first month of the first year. At the end of the first day, KM[1, 1, 1] is updated by using key update function 261 to generate key KM[1, 1, 2] 262 representing a third-level key for the second day of the first month of the first year. KM[1, 1, 2] 262 is used to generate a fourth-level derived key representing a key to be used during first hour of second day of the first month of the first year. The fourth-level derived key KD[1, 1, 2, 1] 270 is derived from KM[1, 1, 2] 262 by using key derivation function ("KDF") 268. The KDF take as input D[1, 1, 2] 267. The input D[1, 1, 2] 267 represents value of date and time at the start of second day of the first month of the first year. Similarly, KM[1, 1, 2] 262 is then updated by using a key update function to derive a third-level key for the next day. Thus, KM[1, 1, 31] 264 represents the third-level key for last day (e.g., 31$^{st}$ day) of the first month of the first year that is generated by applying key update function 263. The third-level key is then used to generate a fourth-level derived key KD[1, 1, 31, 1] 271. The fourth-level derived key represents key to be used during first hour of last day of the first month of the first year. The fourth-level derived key is generated by using KDF 273 that takes as an additional input D[1, 1, 31] 272 where the input D[1, 1, 31] 272 indicates value of date and time at the start of last day (e.g. 31$^{st}$ day) of the first month of the first year.

Figure 8:
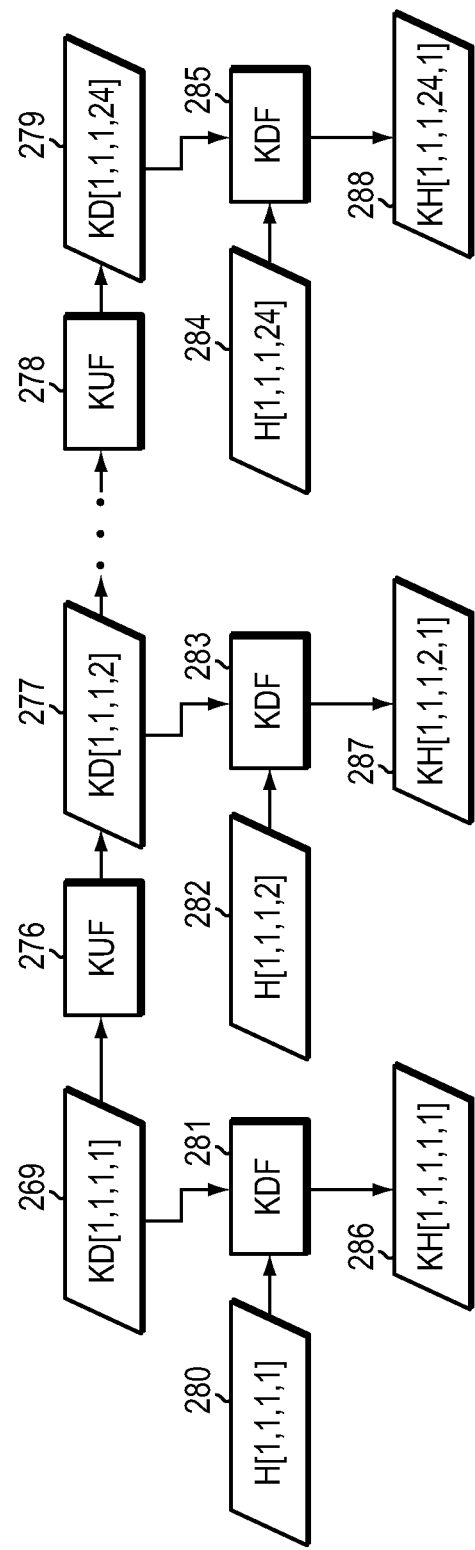

Referring to FIG. 8, shown is a diagram illustrating a fifth-level hierarchy of hourly keys in a hierarchy of derived keys that may be included in an embodiment using the techniques herein. Every hour a new hourly key is generated by using a key update function (KUF) on a key representing the hourly key for previous hour. Further, a fifth-level derived key is generated from the hourly key by using a key derivation function (KDF). For example, in one embodiment, KD[1, 1, 1, 1] 269 is a fourth-level key during first hour of the first day of the first month of the first year. Similarly, KD[1, 1, 1, 2] 277 is a fourth-level key during second hour of the first day of the first month of the first year, and KD[1, 1, 1, 24] 279 is a fourth-level key during last hour (i.e. 24$^{th}$ hour) of the first day of the first month of the first year. A fifth-level key is derived from the fourth-level key where the fifth-level key is then used to derive a secret key (K) for generating an authentication code as explained below in FIG. 9. KD[1, 1, 1] 269 is used to generate a fifth-level derived key representing a key to be used during first use for authentication in the first hour of the first day of the first month of the first year. The fifth-level derived key KH[1, 1, 1, 1, 1] 286 is derived from KD[1, 1, 1, 1] 269 by using key derivation function ("KDF") 281. The KDF takes as input H[1, 1, 1,1] 280. The input H[1, 1, 1, 1] 280 represents value of date and time at the start of first hour of the first day of the first month of the first year. At the end of the first hour, KD[1, 1, 1, 1] 269 is updated by using key update function 276 to generate key KD[1, 1, 1, 2] 277 representing a fourth-level key for the second hour of the first day of the first month of the first year. KD[1, 1, 1, 2] 277 is used to generate a fifth-level derived key representing a key to be used during first use for authentication in the second hour of the first day of the first month of the first year. The fifth-level derived key KH[1, 1, 1, 2, 1] 287 is derived from KD[1, 1, 1, 2] 277 by using key derivation function ("KDF") 283. The KDF take as input H[1, 1, 1, 2] 282. The input H[1, 1, 1, 2] 282 represents value of date and time at the start of second hour of the first day of the first month of the first year. Similarly, KD[1, 1, 1, 2] 277 is then updated by using a key update function to derive a fourth-level key for the next hour. Thus, KD[1, 1, 1, 24] 279 represents the fourth-level key for the last hour (i.e., $24^{th}$ hour) of the first day of the first month of the first year that is generated by applying key update function 278. The fourth-level key is then used to generate a fifth-level derived key KH[1, 1, 1, 24, 1] 288. The fifth-level derived key represents key to be used during first use of authentication in the last hour of the first day of the first month of the first year. The fifth-level derived key is generated by using KDF 285 that takes as an additional input H[1, 1, 1, 24] 284 where the input H[1, 1, 1, 24] 284 indicates value of date and time at the start of the last hour of the first day of the first month of the first year.

Figure 9:
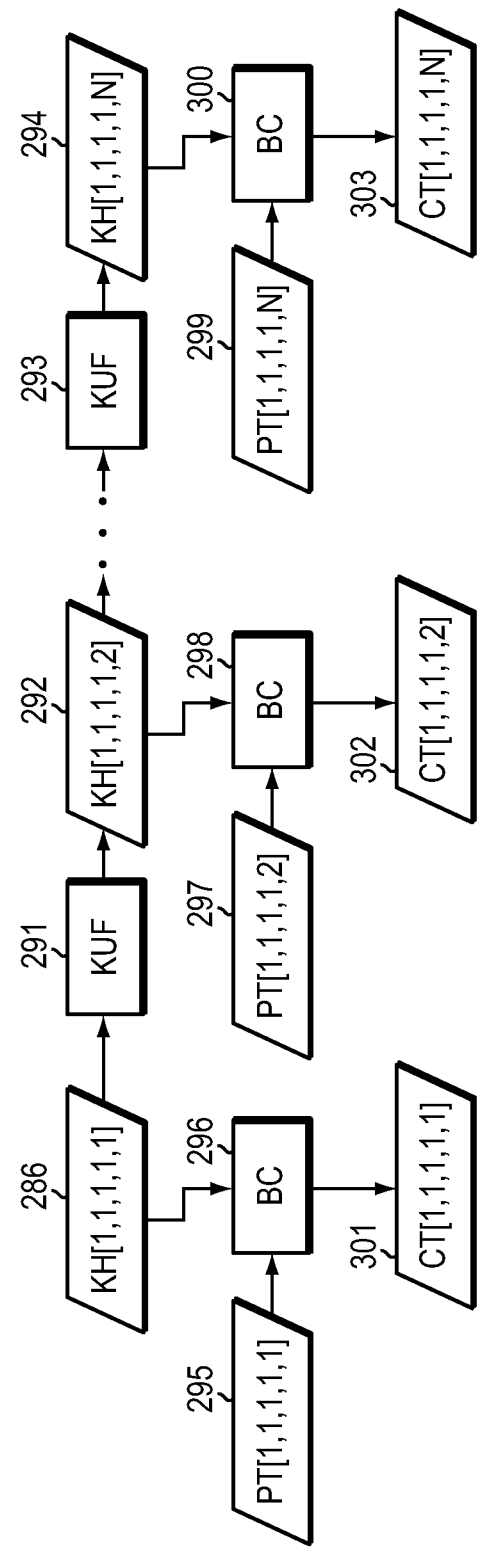

Referring to FIG. 9, shown is a diagram illustrating updating of a hierarchy of derived keys for use in authentication that may be included in an embodiment using the techniques herein. With reference also to FIG. 4 and FIG. 8, a key at the fifth level of the hierarchy of derived keys represents the lowest-level key that is used as a key 202 for generating a secret key 170. The lowest-level key is updated by using a key update function after every time the lowest-level key is used for authentication. For example, in FIG. 9, KH[1, 1, 1, 1, 1] 286 represents a key for first use within the first hour of the first day of the first month of the first year. KH[1, 1, 1, 1, 1] 286 is replaced with KH[1, 1, 1, 1, 2] 292 by using key update function 291 after KH[1, 1, 1, 1, 1] 286 has been used for authentication. KH[1, 1, 1, 1, 2] 292 represents a key to be used second time within the first hour of the first day of the first month of the first year. Similarly, KH[1, 1, 1, 1, 2] 292 is replaced by using a key update function after KH[1, 1, 1, 1, 2] 292 has been used for authentication and so on. Thus, KH[1, 1, 1, 1, n] 294 represents a key to be used $n^{th}$ time within the first hour of the first day of the first month of the first year that is generated by applying key update function 293. In some embodiments, a block cipher, such as the RC6 or Rijndael (AES) algorithms, uses the lowest-level (e.g. fifth-level) key and the plain-text value of the lowest-level key as an input data in order to generate a corresponding cipher-text value of the lowest-level key. The cipher-text value of the lowest-level key is then used as a secret 170 for generating an authentication code. For example, in FIG. 9, KH[1, 1, 1, 1, 1] 286 can be provided as a key input to the block cipher 296 and corresponding plain-text value PT[1, 1, 1, 1, 1] 295 as a data input to the block cipher 296, and CT[1, 1, 1, 1, 1] 301 is generated by applying a cryptographic operation such as AES. Similarly, KH[1, 1, 1, 1, 2] 292 can be provided as a key input to the block cipher 298 and corresponding plain-text value PT[1, 1, 1, 1, 2] 297 as a data input to the block cipher 298, and CT[1, 1, 1, 1, 2] 302 is generated by applying a cryptographic operation. CT[1, 1, 1, 1, 2] 302 is then used for authentication second time within the first hour of the first day of the first month of the first year. Thus, KH[1, 1, 1, 1, n] 294 can be provided as a key input to the block cipher 300 and corresponding plain-text value PT[1, 1, 1, 1, n] 299 as a data input to the block cipher 300, and CT[1, 1, 1, 1, n] 303 is generated by applying a cryptographic operation. CT[1, 1, 1, 1, n] 303 is then used for authentication $n^{th}$ time within the first hour of the first day of the first month of the first year.

Figure 10:
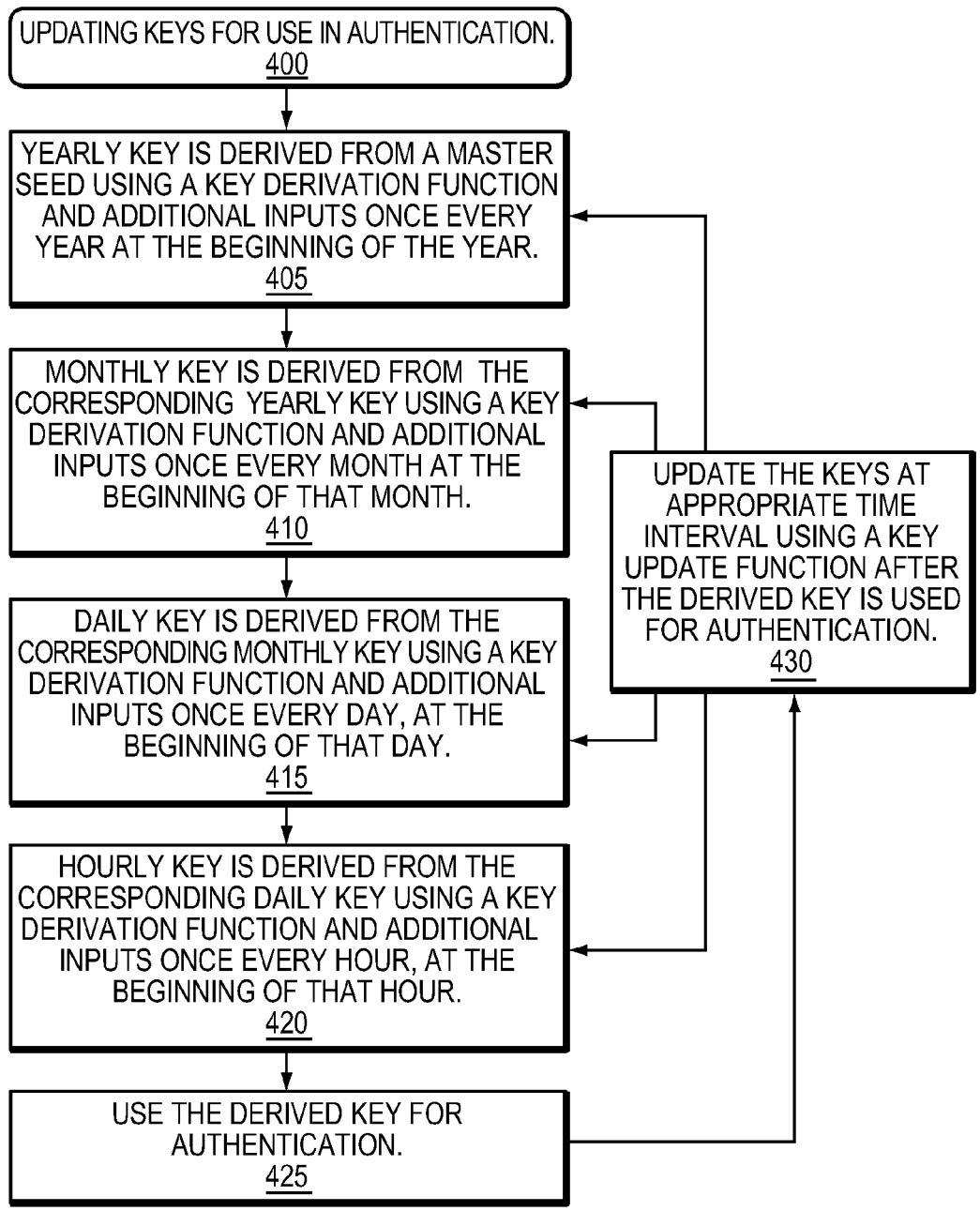
FIG. 10 is a flow diagram illustrating a process that may be used in connection with techniques herein.

Referring to FIG. 10, an example authentication sequence is shown for an embodiment of the current technique. In this embodiment, following an authentication code generation request, an authentication device can generate a secret key by employing the current technique (step 400). A yearly key is derived from a master seed using a key derivation function once every year at the beginning of the year (step 405). The key derivation function also takes as input additional information, such as, value of date and time at the start of that year. Next, a monthly key is derived from the yearly key by using a key derivation function once every month at the beginning of each month (step 410). The key derivation function also takes as input additional information, such as, value of date and time at the start of each month. Next, a daily key is derived from the monthly key by using a key derivation function once every day at the beginning of each day (step 415). The key derivation function also takes as input additional information, such as, value of date and time at the start of each day. Next, an hourly key is derived from the daily key by using a key derivation function once every hour at the beginning of each hour (step 420). The key derivation function also takes as input additional information, such as, value of date and time at the start of each hour. The hourly key derived at each hour is used to generate the authentication code for authentication (step 425). After the hourly key is used for authentication, the hourly key is updated by using a key update function (step 430). Other keys, such as, the yearly key, the monthly key and the daily key are updated based on the time interval at which each of the respective keys are derived. For example, the daily key is derived once per day, at the beginning of the day, then updated each hour after a new hourly key is derived from it.

In various other embodiments, the key derivation function may be based on a counter-based scheme instead of a calendar-based hierarchical derivation scheme as explained above in FIGS. 5-8. In the counter-based scheme, after each lower-level key has been used for a particular number of times, a new key is generated by updating a key. The key that is updated is a higher-level key to the lower-level key that was used for specific number of times. The value of particular number of uses can be set according to the amount of storage available in the authentication system 100.

In an alternative embodiment, the key update function may be implemented as a simple polynomial P(x) function to make derivation of lower-level keys more efficient. According to the simple polynomial P(x) function, $n^{th}$ key value at each level of the hierarchy of derived keys may be obtained by computing function $P^n$ on an initial key value for that level.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in updating keys for use in authentication, the method comprising:
   deriving, by a processor, a set of derived keys by using a key derivation operation, each derived key of the set of derived keys being organized in a hierarchy, wherein a first derived key of the set of derived keys is derived based on a master key, wherein each derived key after the first derived key in the set of derived keys is derived based on a stored representation of a previously derived key in the set of derived keys, wherein the key derivation operation is performed iteratively at each level of the hierarchy for deriving the set of derived keys by using a previously derived key generated during a previous iteration and an additional input to derive a next derived key within the hierarchy during a next iteration;

using a lowest-level derived key of the hierarchy from the set of derived keys for generating an authentication code, wherein a key of the set of derived keys that has been derived last indicates the lowest-level derived key, wherein the lowest-level derived key is combined with additional information for generating the authentication code;

using the authentication code generated from the lowest-level derived key for authentication; and applying a key update operation to replace the lowest-level derived key, wherein the key update operation replaces the lowest-level derived key after the lowest-level derived key has been used for authentication, wherein the key update operation updates each derived key in the set of derived keys based on a criteria, wherein the criteria includes usage of each derived key.

2. The method of claim 1, wherein the stored representation of a higher-level key results from a prior performed key derivation operation based on a next-higher-level key.

3. The method of claim 1, wherein a higher-level key includes a yearly key derived from a master key by performing the key derivation operation, wherein the yearly key is replaced every year at the beginning of each year by applying the key update operation.

4. The method of claim 3, wherein the higher-level key includes a monthly key derived from the yearly key by performing the key derivation operation, wherein the monthly key is replaced every month at the beginning of each month by applying the key update operation.

5. The method of claim 4, wherein the higher-level key includes a daily key derived from the monthly key by performing the key derivation operation, wherein the daily key is replaced every day at the beginning of each day by applying the key update operation.

6. The method of claim 5, wherein the higher-level key includes an hourly key derived from the daily key by performing the key derivation operation, wherein the hourly key is replaced every hour at the beginning of each hour by applying the key update operation.

7. The method of claim 6, wherein the lowest-level derived key for use in authentication results by applying the key derivation operation on the hourly key, wherein the lowest-level derived key is replaced after the lowest-level derived key is used for authentication by applying the key update operation.

8. The method of claim 1, where the authentication code is generated from the lowest-level derived key.

9. The method of claim 1, wherein performing the key derivation operation further comprising accepting an input, wherein the input includes a value corresponding to a date and time at which a higher-level key is generated.

10. The method of claim 9, wherein the input includes a counter indicating the number of times the derived key is used for authentication.

11. A system for use in updating keys for use in authentication, the system comprising:

an authentication device configured to:

derive a set of derived keys by using a key derivation operation, each derived key of the set of derived keys being organized in a hierarchy, wherein a first derived key of the set of derived keys is derived based on a master key, wherein each derived key after the first derived key in the set of derived keys is derived based on a stored representation of a previously derived key in the set of derived keys, wherein the key derivation operation is performed iteratively at each level of the hierarchy for deriving the set of derived keys by using a previously derived key generated during a previous iteration and an additional input to derive a next derived key within the hierarchy during a next iteration;

use a lowest-level derived key of the hierarchy from the set of derived keys for generating an authentication code, wherein a key of the set of derived keys that has been derived last indicates the lowest-level derived key, wherein the lowest-level derived key is combined with additional information for generating the authentication code;

use the authentication code generated from the lowest-level derived key for authentication; and apply a key update operation to replace the lowest-level derived key, wherein the key update operation replaces the lowest-level derived key after the lowest-level derived key has been used for authentication, wherein the key update operation updates each derived key in the set of derived keys based on a criteria, wherein the criteria includes usage of each derived key.

12. The system of claim 11, wherein the stored representation of a higher-level key results from a prior performed key derivation operation based on a next-higher-level key.

13. The system of claim 11, wherein a higher-level key includes a yearly key derived from a master key by performing the key derivation operation, wherein the yearly key is replaced every year at the beginning of each year by applying the key update operation.

14. The system of claim 13, wherein the higher-level key includes a monthly key derived from the yearly key by performing the key derivation operation, wherein the monthly key is replaced every month at the beginning of each month by applying the key update operation.

15. The system of claim 14, wherein the higher-level key includes a daily key derived from the monthly key by performing the key derivation operation, wherein the daily key is replaced every day at the beginning of each day by applying the key update operation.

16. The system of claim 15, wherein the higher-level key includes an hourly key derived from the daily key by performing the key derivation operation, wherein the hourly key is replaced every hour at the beginning of each hour by applying the key update operation.

17. The system of claim 16, wherein the lowest-level derived key for use in authentication results by applying the key derivation operation on the hourly key, wherein the lowest-level derived key is replaced after the lowest-level derived key is used for authentication by applying the key update operation.

18. The system of claim 11, where the authentication code is generated from the lowest-level derived key.

19. The system of claim 11, wherein performing the key derivation operation further comprising accepting an input, wherein the input includes a value corresponding to a date and time at which a higher-level key is generated.

20. The system of claim 19, wherein the input to the cryptographic operation includes a counter indicating the number of times the derived key is used for authentication.

* * * * *